United States Patent
Isbell

(12) 
(10) Patent No.: US 10,455,135 B2
(45) Date of Patent: Oct. 22, 2019

(54) ENABLING CROWD-SOURCED VIDEO PRODUCTION

(71) Applicant: Facebook, Inc., Menlo Park, CA (US)

(72) Inventor: Bradley Isbell, Seattle, CA (US)

(73) Assignee: Facebook, Inc., Menlo Park, CA (US)

( * ) Notice: Subject to any disclaimer, the term of this patent is extended or adjusted under 35 U.S.C. 154(b) by 33 days.

(21) Appl. No.: 15/817,131

(22) Filed: Nov. 17, 2017

(65) Prior Publication Data

US 2019/0158723 A1    May 23, 2019

(51) Int. Cl.
| | |
|---|---|
| *H04N 5/232* | (2006.01) |
| *H04N 21/218* | (2011.01) |
| *H04N 5/445* | (2011.01) |
| *H04N 21/854* | (2011.01) |
| *G11B 27/031* | (2006.01) |
| *H04N 21/81* | (2011.01) |

(52) U.S. Cl.
CPC ....... *H04N 5/23206* (2013.01); *G11B 27/031* (2013.01); *H04N 5/44591* (2013.01); *H04N 21/21805* (2013.01); *H04N 21/8126* (2013.01); *H04N 21/854* (2013.01)

(58) Field of Classification Search
None
See application file for complete search history.

(56) References Cited

U.S. PATENT DOCUMENTS

| | | | | |
|---|---|---|---|---|
| 8,421,840 B2* | 4/2013 | Eleftheriadis | .......... | H04N 7/152 348/14.07 |
| 8,941,708 B2* | 1/2015 | Skramstad | ............. | H04N 5/265 348/14.01 |
| 9,001,178 B1* | 4/2015 | Leske | .................... | H04N 7/155 348/14.08 |
| 9,602,771 B2* | 3/2017 | Duckworth | ............ | H04N 7/142 |
| 9,706,171 B1* | 7/2017 | Riley | ..................... | H04N 7/152 |
| 9,743,042 B1* | 8/2017 | Faulkner | ............. | H04L 65/1063 |
| 9,756,286 B1* | 9/2017 | Faulkner | ............... | H04L 65/403 |
| 9,800,835 B2* | 10/2017 | Nimri | ..................... | H04N 7/152 |
| 9,942,519 B1* | 4/2018 | Pan | ..................... | H04L 65/1093 |
| 2013/0038618 A1* | 2/2013 | Urbach | ................. | G06F 9/5005 345/522 |
| 2015/0109401 A1* | 4/2015 | Kasatani | .................. | H04N 7/15 348/14.07 |
| 2018/0270452 A1* | 9/2018 | Moon | .................... | H04N 7/152 |

* cited by examiner

*Primary Examiner* — James M Hannett
(74) *Attorney, Agent, or Firm* — Baker Botts L.L.P.

(57) ABSTRACT

In one embodiment, a method includes determining a layout for an output screen. The layout may be determined based on a producer interface. A video production device operated either by a server or by a client device may display a plurality of data input streams on the output screen in accordance with the layout. Each of the data input streams may be generated by one of several image capture devices. Each image capture device may include a display screen that displays guidelines as the image capture device captures images. The guidelines may have a first dimension that is based on the layout. The video production device may receive an indication that the layout has changed. The video production device may send instructions to one or more of the image capture devices to adjust the guidelines to a second dimension based on the change to the layout.

20 Claims, 9 Drawing Sheets

ENABLING CROWD-SOURCED VIDEO PRODUCTION

TECHNICAL FIELD

This disclosure generally relates to video production over an online network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a video production system may enable crowd-sourced video production. The video production system may enable multiple remote image capture devices to send video to a central production server. The video production system may provide a producer interface that may provide for dynamic adjustment to guidelines on a display screen of one or more of the remote image capture devices. The video production system may facilitate live broadcast of the multiple video input streams in a combined layout. The producer interface may comprise multiple windows that each show a data input stream generated by one of the image capture devices. The producer interface may also comprise an output screen, which may display the video feed that is being outputted over an online network to an audience. The producer may be able to change the layout of the output screen. For example, the producer may be able to change the number of data input streams that are sent to the output screen. The output screen may display one or more videos that a producer selects from the data input streams. The area of the input data stream that is displayed on the output screen may change based on the number of data streams being sent to the display screen and on the layout of the output screen. The output screen may also display one or more titles, subtitles, ticker information, RSS feeds, or any other suitable data, which may affect the area of one or more input data streams that are sent to the output screen. Each image capture device may have a display screen and the display screen may display guidelines which correspond to the pixels in the input data stream that will be displayed on the output screen. As the producer selects or deselects input data streams for display, the display screen on each image capture device may update to display guidelines that correspond to the updated selection of data streams on the producer interface.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, a video production system may provide for crowd-sourced video production via dynamic adjustment to guidelines on a display screen of one or more remote image capture devices. A crowd-sourced video production may be understood to be a live or pre-recorded broadcast of multiple video input streams from multiple image capture devices located in separate locations. The video production system may be controlled by a producer interface. The producer interface may comprise multiple windows that each show a data input stream generated by one of the image capture devices. The producer interface may also comprise an output screen, which may display the video feed that is being outputted over an online network to an audience. A producer may be any person or entity that has control of a producer interface similar to the one described herein. The producer may be able to change the layout of the output screen. For example, the producer may be able to change the number of data input streams that are sent to the output screen. The output screen may display one or more videos that a producer selects from the data input streams. The area of the input data stream that is displayed on the output screen may change based on the number of data streams being sent to the display screen and on the layout of the output screen. The output screen may also display one or more titles, subtitles, ticker information, RSS feeds, or any other suitable data, which may affect the area of one or more input data streams that are sent to the output screen. Each image capture device may have a display screen and the display screen may display guidelines which correspond to the pixels in the input data stream that will be displayed on the output screen. In this disclosure, data input streams, input streams, and video input streams may all be understood to mean all data (e.g., audio, video, location data, heat data, movement data from sensors on the image capture device) that is captured by the image capture device and sent to the video production device. As the producer selects or deselects input data streams for display, the display screen on each image capture device may update to display guidelines that correspond to the updated selection of data streams on the producer interface.

Figure 1:
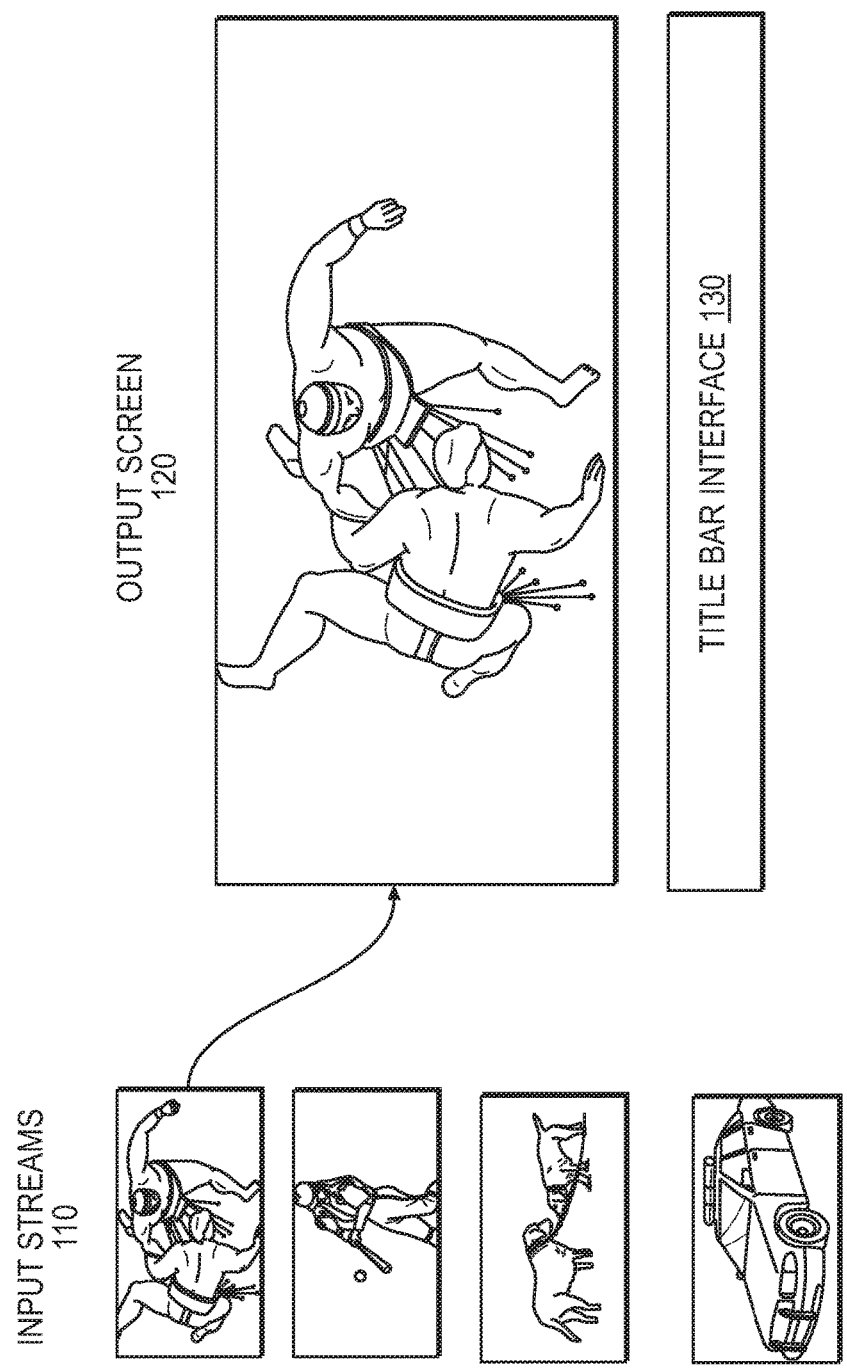
FIG. 1 illustrates an example producer interface as part of an example video production system.

FIG. 1 illustrates an example producer interface as part of an example video production system. In particular embodiments, a video production device for crowd-sourced video may determine a layout for an output screen. The video production device may be any suitable computing device, including a computer desktop, a laptop, a tablet, a smartphone, or any other suitable device. The layout of the output screen may be determined at least in part by a producer interface that is operated by a producer. In particular embodiments, the producer interface may comprise a plurality of input streams 110 each displayed in a window on the producer interface. Each window may be selectable for display on the output screen. The output screen may display a subset of the input streams 110 displayed on the producer interface. A subset may be all the input streams 110. The input streams 110 may each show video and/or audio that may be being captured by an image capture device in real-time. The producer interface may additionally display an output screen 120, and a title bar interface 130. The producer interface may be entirely displayed on a single display screen of the video production device, or on multiple display screens. The input streams 110 may display real-time video and audio feeds of images and sounds captured by remote image capture devices. The image capture devices may be any suitable image capture devices, including cameras, smartphones, webcams, and the like. In particular embodiments, the image capture device may be a remote image capture device, located in any region with a data connection throughout the world. The image capture device may capture still images, video images, and audio data. The image capture device may produce a data input stream comprising still images, video images, and audio data. The image capture device may send the data input stream to the video production device for use by the producer. The producer may interface with the producer interface in several ways, including by selecting one or more of the data input streams 110 to be sent to the output screen 120. In the example shown by FIG. 1, one data input stream has been selected to be sent to the output screen 120. Although this disclosure describes determining a layout for an output screen in a particular manner, this disclosure contemplates determining a layout for an output screen in any suitable manner.

Figure 2:
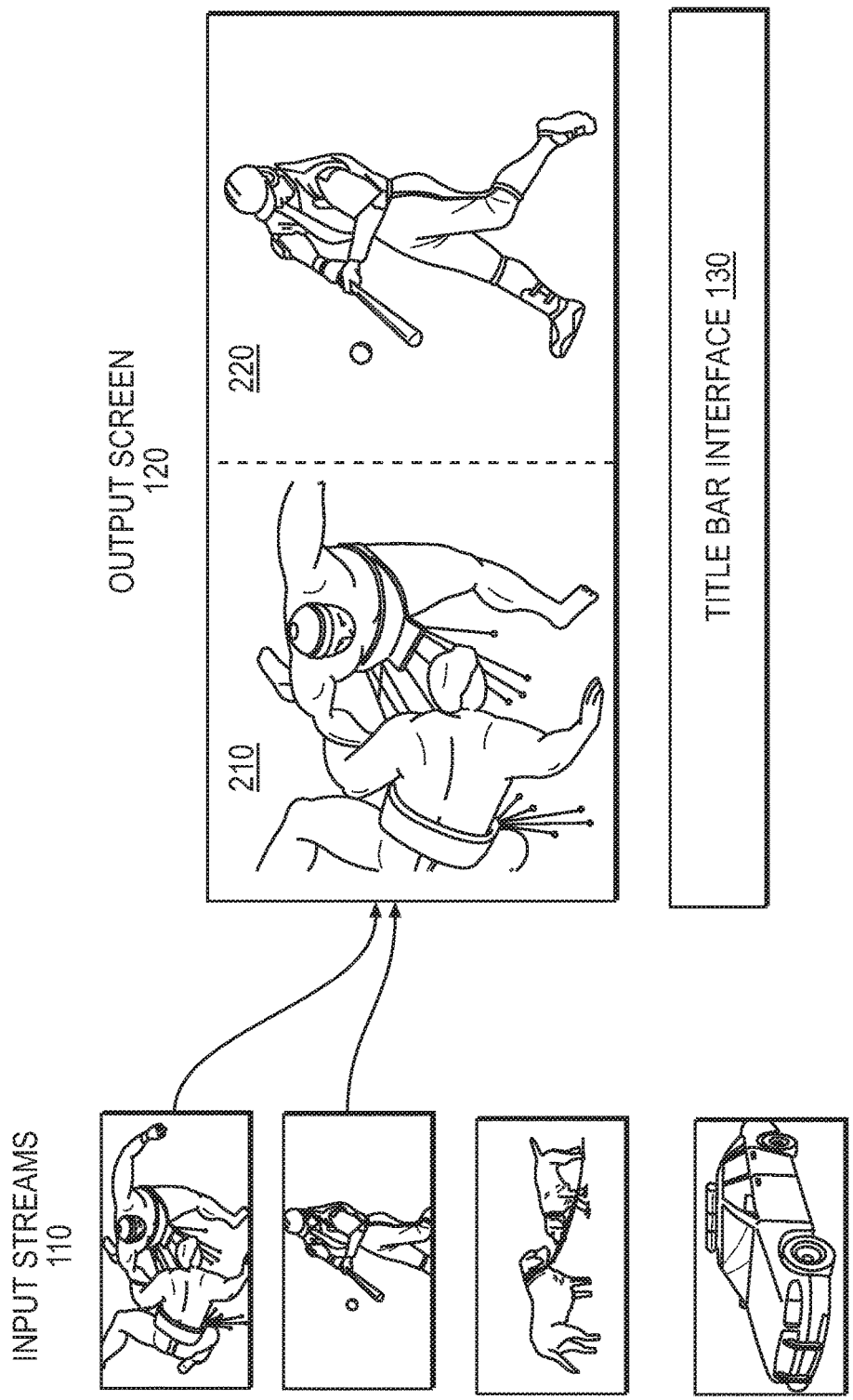
FIG. 2 illustrates another example producer interface as part of an example video production system.

FIG. 2 illustrates another example producer interface as part of an example video production system. In particular embodiments, the video production device may display a plurality of data input streams on the output screen in accordance with the layout. In the example of FIG. 2, two data input streams have been selected to be sent to the output screen 120. When more than one data input stream is selected for display on the output screen 120, the area of the video feed associated with each data input stream may be adjusted. This may be because the output screen may have a set dimension and the area of the dimensions of the plurality of data input streams may need to be adjusted so that all selected data input streams may be displayed on the output screen 120. In the example of FIG. 2, each window 210 and 220 of the output screen 120 displays an input from input streams 110. The windows 210 and 220 may display less than the full amount of data or pixels that were captured by the image capture devices providing input streams 110. This may be because the output screen is not sufficiently large to display the full amount of data captured by the image capture devices. Thus, the area that is displayed on the output screen 120 may be smaller than the area captured by the image capture devices and sent to the producer interface as input streams 110. Although this disclosure describes displaying a plurality of data input streams on an output screen in a particular manner, this disclosure contemplates displaying a plurality of data input streams on an output screen in any suitable manner.

Figure 3:
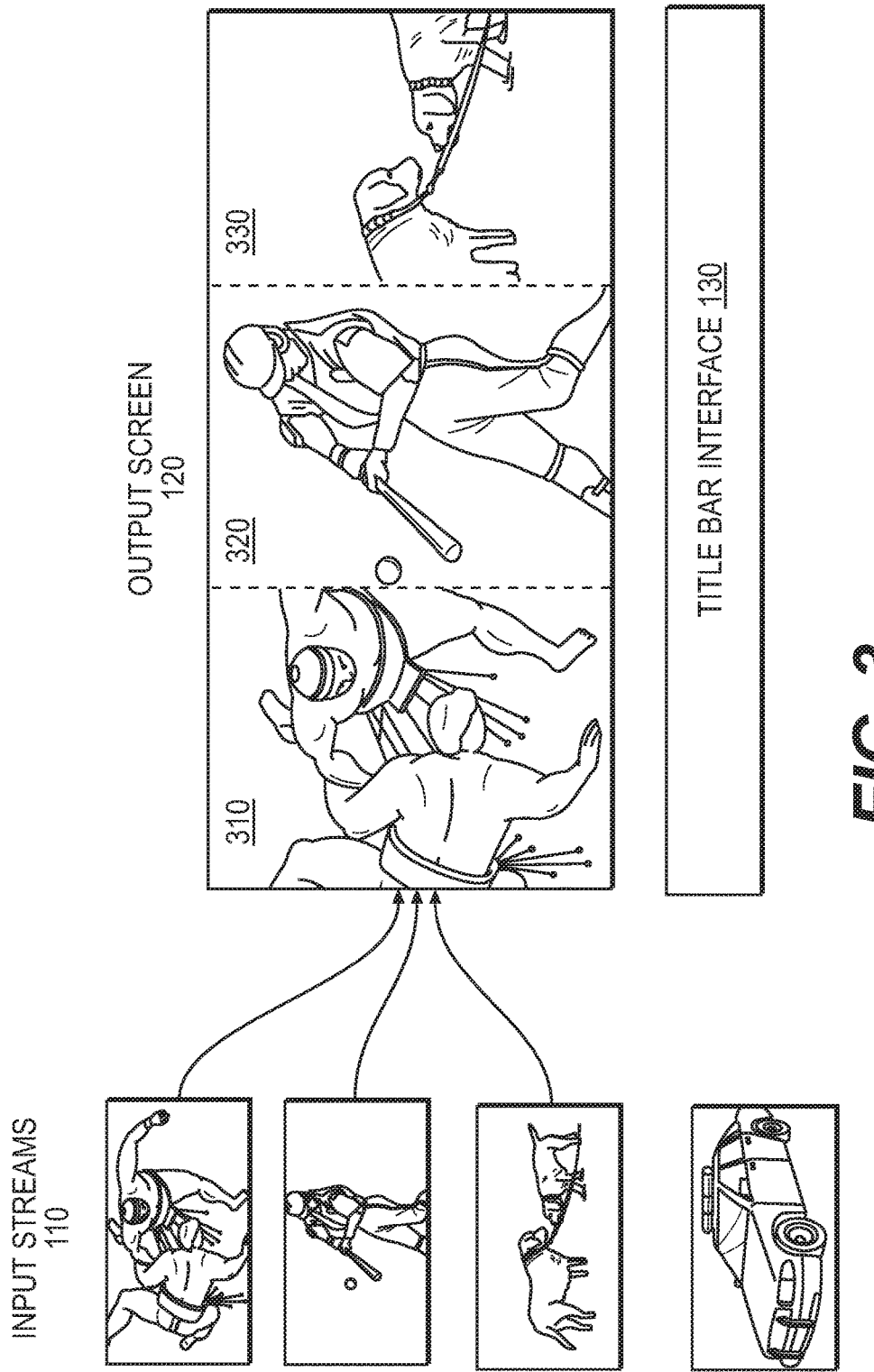
FIG. 3 illustrates another example producer interface as part of an example video production system.

FIG. 3 illustrates another example producer interface as part of an example video production system. In particular embodiments, the video production device may receive an indication that the layout of the output screen 120 has changed. The layout of the output screen 120 may change when the producer adds one or more input streams 110 to the output screen 120. In the example of FIG. 3, the producer has added a third input stream 110 to the output stream 120. Because of this, the display of each window 210 and 220 needs to be adjusted to make room for a third window. Each window 310, 320, and 330 have a different dimension (e.g., they become more narrow) than windows 210 and 220. This may be because the output screen is not sufficiently large to display the full amount of data captured by the image capture devices. Thus, the area that is displayed on the output screen 120 may be smaller than the area captured by the image capture devices and sent to the producer interface as input streams 110. In particular embodiments, the layout of the output screen 120 may change through other means, such as when a producer removes an input stream 110 from the output screen 120 or changes the position of windows 310, 320, and 330. In particular embodiments, the producer may arrange the windows 310, 320, 330 in any suitable arrangement, such as by stacking them, placing two on the top row and one on the bottom row, arranging them in a "honeycomb" configuration (e.g., the windows 310, 320, 330 change shape from rectangular to a polygon shape and are arranged in a way that resembles a honeycomb), or any other suitable arrangement. In particular embodiments, windows 310, 320, and 330 may change shape and become circular, triangular, polygonal, or any other suitable shape. Although this disclosure describes displaying a plurality of data input streams on an output screen in a particular manner, this disclosure contemplates displaying a plurality of data input streams on an output screen in any suitable manner.

Figure 4:
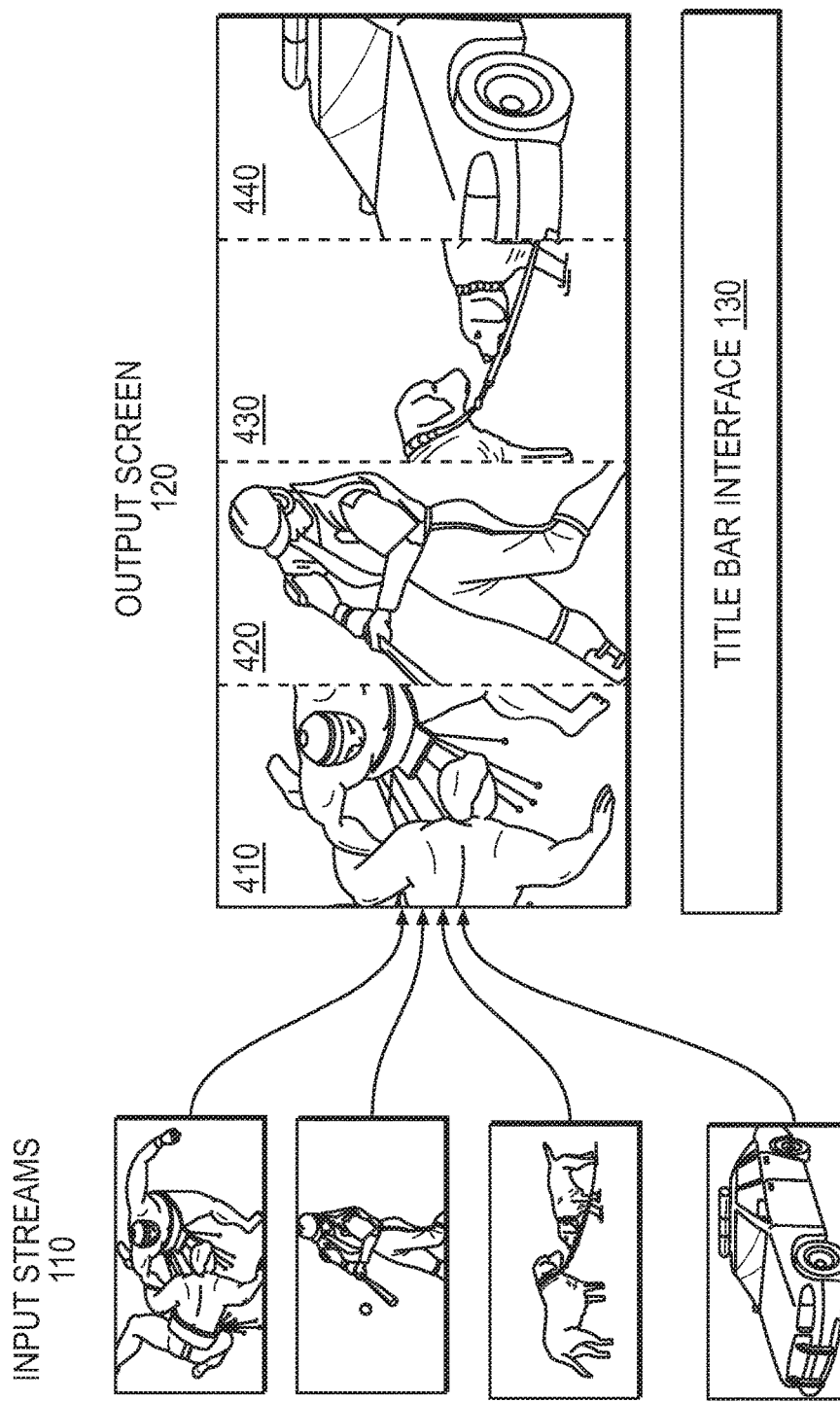
FIG. 4 illustrates another example producer interface as part of an example video production system.

FIG. 4 illustrates another example producer interface as part of an example video production system. In particular embodiments, the video production device may receive an indication that the layout of the output screen 120 has changed. The layout of the output screen 120 may change when the producer adds one or more input streams 110 to the output screen 120. In the example of FIG. 4, the producer has added a fourth input stream 110 to the output stream 120. Because of this, the display of each window 310, 320, and 330 needs to be adjusted to make room for a fourth window. Each window 410, 420, 430, and 440 have a different dimension (e.g., they become more narrow) than windows 310, 320, and 330. This may be because the output screen is not sufficiently large to display the full amount of data captured by the image capture devices. Thus, the area that is displayed on the output screen 120 may be smaller than the area captured by the image capture devices and sent to the producer interface as input streams 110. In particular embodiments, the layout of the output screen 120 may change through other means, such as when a producer removes an input stream 110 from the output screen 120 or changes the position of windows 410, 420, 430, and 440. In particular embodiments, the producer may arrange the windows 410, 420, 430, 440 in any suitable arrangement, such as by stacking them, placing two on the top row and one on the bottom row, arranging them in a "honeycomb" configuration (e.g., the windows 410, 420, 430 change shape from rectangular to a polygon shape and are arranged in a way that resembles a honeycomb), or any other suitable arrangement. In particular embodiments, windows 410, 420, and 430 may change shape and become circular, triangular, polygonal, or any other suitable shape. Although this disclosure describes displaying a plurality of data input streams on an output screen in a particular manner, this disclosure contemplates displaying a plurality of data input streams on an output screen in any suitable manner.

Figure 5:
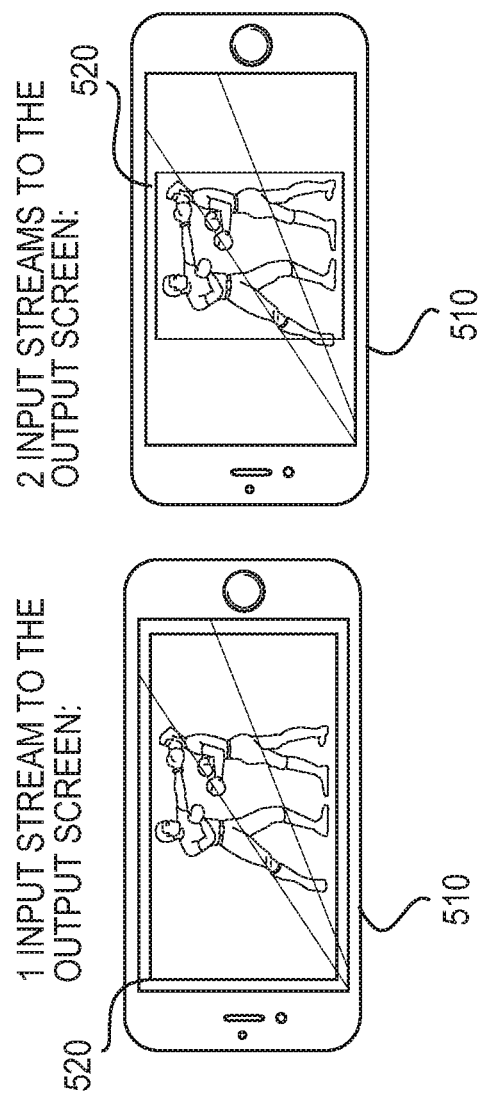
FIG. 5 illustrates an example display screen of an example image capture device that comprises an example set of guidelines that may be updated based on a change to a layout of an example output screen.

FIG. 5 illustrates an example display screen of an example image capture device 510 that comprises an example set of guidelines 520 that may be updated based on a change to a layout of an example output screen. In particular embodiments, each of the data input streams 110 may be generated by one of a plurality of image capture devices (such as the image capture device 510). Each image capture device may comprise a display screen that displays guidelines 520 as the image capture device captures the respective data input stream. In particular embodiments, the guidelines may have a first dimension that is based at least in part on the layout. As an example and not by way of limitation, the layout of the output screen may display a single input stream, similar to the layout shown in FIG. 1. In this case, the guidelines 510 may resemble the guidelines 520 on the left side of FIG. 5, encompassing a relatively larger portion of the display screen of the image capture device 510. As another example and not by way of limitation, the layout of the output screen may display more than one input stream, similar to the layout shown in FIG. 2. In this case, the guidelines 520 may resemble the guidelines 520 on the right side of FIG. 5, encompassing a relatively smaller portion of the display screen of the image capture device 510. The dimension of guidelines 520 may change based on the layout of the output screen 120. The guidelines may correspond to the area of the input stream 110 that is being displayed on the output screen 120. Thus, when more input streams 110 are displayed on the layout, the guidelines 520 may become smaller. In particular embodiments, the first dimension may comprise a first vertical dimension and a first horizontal dimension. The first vertical dimension and the first horizontal dimension may be expressed as a number of pixels, or by any other suitable unit of measurement. Note that the unlabeled diagonal lines on the display screen of image capture device 510 merely indicate the dimension of the display screen. Although this disclosure describes updating a first dimension for guidelines on a display screen of an image capture device in a particular manner, this disclosure contemplates updating a first dimension for guidelines on a display screen of an image capture device in any suitable manner.

In particular embodiments, the video production device, upon receiving the indication that the layout has changed, may send instruction to each of the one or more remote recording devices to adjust the guidelines to a second dimension based on the change to the layout. In particular embodiments, the second dimension may comprise a second vertical dimension and a second horizontal dimension, wherein the second horizontal dimension is smaller than the first horizontal dimension. As an example and not by way of limitation, if the layout initially shows a single output stream 110 (e.g., FIG. 1), the image capture device may show guidelines having a first dimension. In particular embodiments, the first dimension may be relatively large, encompassing most of the display screen. In particular embodiments, the indication that the layout for the output screen has changed comprises an indication that the producer has added at least one additional data input stream 110 to the output screen 120. In response to the indication, the video production device may send instructions to the remote image capture devices to update the guidelines 510 to substantially match the area of the input stream 110 that is being displayed on the output screen 120. Each time the producer adds another input stream 110, the video production device may send instructions to the image capture devices 510 to update their respective guidelines 520 based on the change to the layout (e.g., by the addition or removal of an input stream 110, or by the rearrangement, reshape, or resizing of one or more windows on the output screen, or by the addition of a title bar or other content to the output screen). Although this disclosure describes sending instructions to image capture devices in a particular manner, this disclosure contemplates sending instructions to image capture devices in any suitable manner.

In particular embodiments, the indication that the layout for the output screen has changed comprises an indication that the producer has added a media item to the output screen as an overlay element on the output screen. The media item may be any suitable media item, including, but not limited to, pre-recorded video, live video, a photo, or text. In particular embodiments, the media item may comprise a title bar, a news item, or a username. As an example and not by way of limitation, a producer may add a title bar to the layout of the output screen 120 that states a title for one of the input streams 110. As an example and not by way of limitation, the producer may select an input stream of a professor lecturing about philosophy, and may also add a title bar that states, "Dr. Richard Nygard, Professor of Philosophy." In particular embodiments, the producer may be able to control the transparency of the media item so that it is partially see-through. As another example and not by way of limitation, the producer may select several input streams 110 of video feeds that are related to a riot occurring in downtown Los Angeles. At the bottom of the output screen, the producer may add a TWITTER or FACEBOOK feed of live text updates and reactions to the riot situation. In particular embodiments, the video production system may automatically position the media item based on the content on the output screen. With reference to FIG. 4, the producer may wish to add a media item to window 440 that says "Pawnee Police Department." Instead of having to size and position the media item herself, the producer may simply "drag and drop" the item onto window 440. Once the video production system detects that a media item has been "dropped" onto window 440, the video production system may analyze the content in window 440 to determine which portion of the window are being occupied by foreground objects and which portions are not being occupied by foreground objects. The video production system may then position the media item to be located in a position that is unoccupied by any foreground object. In the example of window 440, the bottom portion of the window is not being occupied by foreground objects, so the video production system may play the media item "Pawnee Police Department" in the bottom portion of the window 440. In particular embodiments, the media item may comprise an accreditation of the content generator. As an example and not by way of limitation, within window 410 of FIG. 4, a media item may state, "Footage courtesy of Japan Sumo Association." Although this disclosure describes adding a media item to an output screen in a particular manner, this disclosure contemplates adding a media item to an output screen in any suitable manner.

In particular embodiments, only those image capture devices which are registered or otherwise trusted by the video production device may be authorized to send data input streams to the video production device. However, it may be advantageous to allow other image capture devices to send data input streams to the video production device. As an example and not by way of limitation, a producer may wish to broadcast a live video of a sporting event, such as the Boston Marathon. There may be thousands of spectators along the sidelines of the race, all of whom may be equipped with an image capture device (e.g., a smartphone). The producer may wish to enable several spectators to send video input streams to the video production device. For example, at each mile marker along the 26.2 miles of the marathon, one or more spectators may wish to capture video and audio and send it to the producer for broadcast. If they are not registered with the video production device or are otherwise unknown by the video production device, they may need to first register or otherwise become trusted. To accomplish this, in particular embodiments, the video production device may receive a request from an unknown remote image capture device, and then, in response to the request, it may send a web resource (e.g., a Universal Resource Locator) to the unknown image capture device. The video production device may then receive an acknowledgement from the additional image capture device. In response to the acknowledgement, the video production device may add the additional data input stream generated by the remote image capture device to the plurality of data input streams based on the acknowledgement. Although this disclosure describes adding an additional data input stream to a plurality of data input streams in a particular manner, this disclosure contemplates adding an additional data input stream to a plurality of data input streams in any suitable manner.

In particular embodiments, to be added to the plurality of data input streams, an unknown image capture device may scan a matrix barcode (e.g., QR CODE), that has been previously positioned in a particular location and send that scan to the video production device in order to be added to the plurality of data input streams. As an example and not by way of limitation, the day before the Boston Marathon, the producer may place matrix barcodes at every mile marker of the 26.2 mile race. The matrix barcodes may be printed on paper and may be fastened to a wall or utility pole, or may be made known by any other suitable manner. Along with the barcode, the producer may write, "Scan this QR CODE to live stream the action!" Then, a user of an image capture device may scan the barcode and it may be automatically sent or manually sent to the video production device, and the data stream captured by the camera of the image capture device may be added to the plurality of data input streams on the producer layout. Although this disclosure describes adding an additional data input stream to a plurality of data input streams in a particular manner, this disclosure contemplates adding an additional data input stream to a plurality of data input streams in any suitable manner.

In particular embodiments, the producer may have exclusive control over the producer interface and layout of the output screen 120. A user of an image capture device may have control over (1) whether to capture images and audio, (2) what images and audio to capture, and (3) whether to send the captured images and audio to the video production device. Once the data stream is sent to the video production device, the user of the image capture device may have no control of or access to the data input stream. The producer may be the only user that has access to the data input streams. Although this disclosure describes allocating control over a producer interface in a particular manner, this disclosure contemplates allocating control over a producer interface in any suitable manner.

In particular embodiments, to further facilitate the addition of data input streams generated by trusted image capture devices to the plurality of data input streams, the video production system may use aspects of a social graph maintained by a social-networking system. As explained in more detail below, a social-networking system may maintain a social graph. The social graph may comprise a plurality of nodes and a plurality of edges connecting the nodes. Each edge connecting two of the nodes may correspond to a relationship between the two nodes. For example, if a user Alex has an edge connection to another user, Alison, this may correspond to a friend relationship or other first-degree connection between Alex and Alison. Edge connections may exist between users and users, users and concepts (e.g., football, sous vide cooking), users and entities (e.g., the Green Bay Packers, NIKE). The edge connections may correspond to friend relationships, "following" relationships, "like" relationships, or any other suitable relationships. In particular embodiments, the social graph may comprise a first node that corresponds to a producer. The social graph may also comprise a plurality of second nodes that each correspond to users of the social-networking system. In particular embodiments, the video production system may access the social graph to determine that a relationship exists between a producer node corresponding to a producer and one or more second nodes corresponding to users who are requesting to join a video broadcast by sending data input streams to the producer interface. As an example and not by way of limitation, a producer may be broadcasting a video feed of the Boston Marathon. The producer may have several friends or followers on the online social network, each of whom may correspond to a node in the social graph that has an edge connection to a node corresponding to the producer. Some of these friends or followers may be competing in or attending the Boston Marathon as spectators, and may wish to contribute to the live broadcast by sending the data captured by their image capture devices (e.g., smartphones) to the producer interface for the producer to use at her discretion. The image capture devices of these users may send a request to the video production system to join the broadcast. The video production system (e.g., by means of the social-networking system) may access the social graph to determine if these users correspond to nodes that have an edge connection to the node corresponding to the producer. If there is an edge connection, then the video production system may add the data streams generated by the image capture devices of the requesting users to the plurality of data input streams on the producer interface. Although this disclosure describes adding data input streams to a producer interface in a particular manner, this disclosure contemplates adding data input streams to a producer interface in any suitable manner.

In particular embodiments, the video production system may automate some or all of the actions performed by the producer. To continue the above example of the Boston Marathon and not by way of limitation, several dozen or even hundreds of data input streams may be added to the producer interface. The number of data input streams may be too high for a single producer to manage in real time, as would be necessary for a live broadcast of the Boston Marathon. However, the video production system may be able to analyze the data input feeds and determine which data input feeds would be the most relevant or interesting to a viewing audience. The video production system may evaluate the data input feeds according to several factors. These factors may include audio data, light data, geographic data, camera shake, image quality, or any other suitable factor. As an example and not by way of limitation, the video production system may analyze the audio data of several data input streams. Because the most interesting parts of a marathon are often the loudest (e.g., screaming fans, lots of runners) the video production system may score a video feed with loud audio data higher than a video feed that is more quiet, since it is likely that a quiet video feed would be capturing data that is less interesting to a viewing audience (in this particular example). As another example and not by way of limitation, the video production device may analyze the light data of input streams. Because the Boston Marathon is held outdoors in the middle of the day, video feeds that are darker may signify that the image capture device is indoors and thus capturing images that are also less relevant or interesting to a viewing audience. Thus the video production system may score a light data stream higher than a dark data stream. The same may be the case with regard to geographic data. The video production system may have a forecast of how fast particular runners may run the Boston Marathon, or may have access to the runners' location data, as runners often run with location chips in their shoes or bibs. The video production system may use the location data of the image capture devices along the marathon route to determine if the images and audio being captured coincide with any particular runner, based on that runner's location data or forecasted location based on the runner's previous marathon performances. By doing this, the video production system may create a heat map of the marathon route based on the location of one or more marathon runners. As locations along the map becomes "hotter," the video production system may add data input streams that are close to the hot spots to the output screen, since it is likely that those data input streams are capturing interesting or relevant images to the viewing audience. As another example and not by way of limitation that is unrelated to a marathon, a producer may wish to broadcast video and audio related to a protest. The epicenter of the protest may have a particular geographic location, it may be taking place at night, and it may be loud. The producer may set the input streams to be selected automatically based on the geographic location of the image capture device, the light level, and the noise level. Although this disclosure describes adding data input streams to a producer interface in a particular manner, this disclosure contemplates adding data input streams to a producer interface in any suitable manner.

In particular embodiments, the video production system may allow many users to "call in" to the broadcast. As an example and not by way of limitation, a producer may wish to broadcast a QVC-style show about a new broom. The producer may ask viewers of the broadcast to "call in" to share their experiences with this particular broom. Viewers may "call in" to the broadcast by sending the producer a request over the social-networking system or by any other suitable means (e.g., entering a URL in their browser window, scanning a QR Code). Viewers may then request to join the broadcast, but instead of being added to the output screen or user interface automatically, they may be asked to enter a short description of their reason for calling in and the producer may be able to see the descriptions. The producer may be able to add whichever data input streams she desires, based on the descriptions and other factors, as discussed above. Although this disclosure describes adding data input streams to a producer interface in a particular manner, this disclosure contemplates adding data input streams to a producer interface in any suitable manner.

Figure 6:
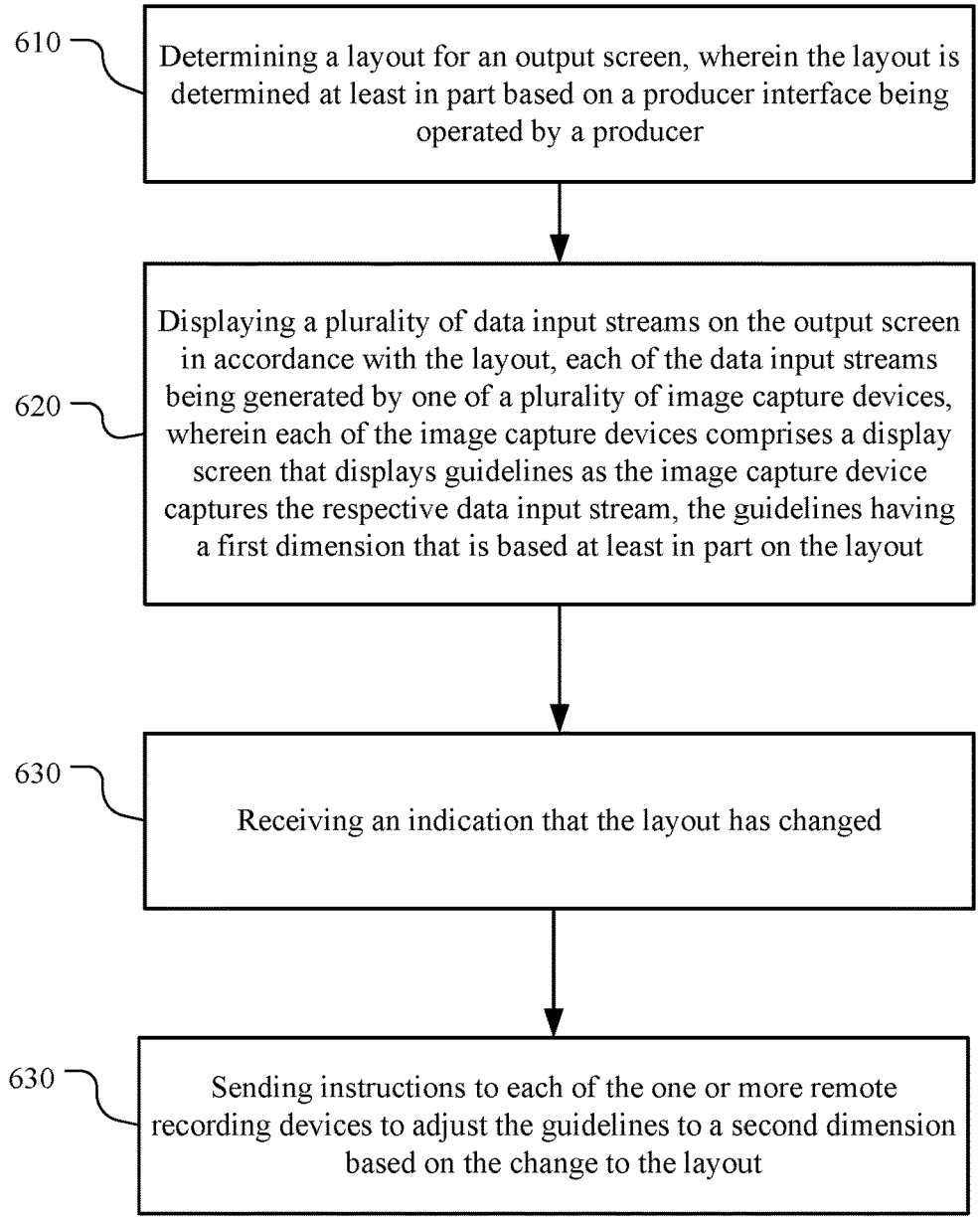
FIG. 6 illustrates an example method for sending instructions for dynamic adjustment to guidelines on a display screen of a remote image capture device.

FIG. 6 illustrates an example method 600 for sending instructions for dynamic adjustment to guidelines on a display screen of a remote image capture device. The method may begin at step 610, where a video production device may determine a layout for an output screen, wherein the layout is determined at least in part based on a producer interface being operated by a producer. At step 620, the video production device may display a plurality of data input streams on the output screen in accordance with the layout, each of the data input streams being generated by one of a plurality of image capture devices, wherein each of the image capture devices comprises a display screen that displays guidelines as the image capture device captures the respective data input stream, the guidelines having a first dimension that is based at least in part on the layout. At step 630, the video production device may receive an indication that the layout has changed. At step 640, the video production device may send instructions to each of the one or more remote recording devices to adjust the guidelines to a second dimension based on the change to the layout. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for sending instructions for dynamic adjustment to guidelines on a display screen of a remote image capture device, including the particular steps of the method of FIG. 6, this disclosure contemplates any suitable method for sending instructions for dynamic adjustment to guidelines on a display screen of a remote image capture device including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
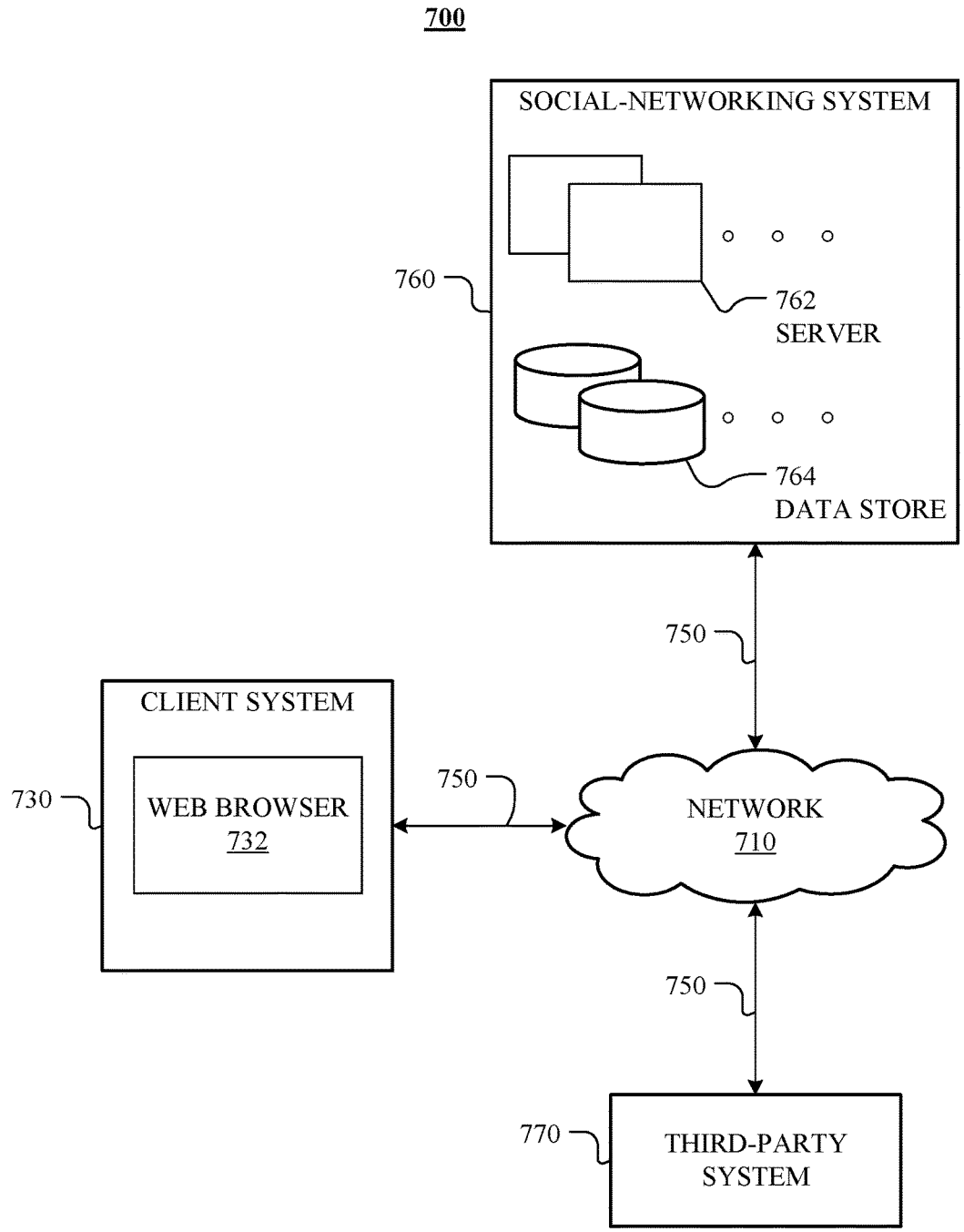
FIG. 7 illustrates an example network environment associated with a social-networking system.

FIG. 7 illustrates an example network environment 700 associated with a social-networking system. Network environment 700 includes a client system 730, a social-networking system 760, and a third-party system 770 connected to each other by a network 710. Although FIG. 7 illustrates a particular arrangement of client system 730, social-networking system 760, third-party system 770, and network 710, this disclosure contemplates any suitable arrangement of client system 730, social-networking system 760, third-party system 770, and network 710. As an example and not by way of limitation, two or more of client system 730, social-networking system 760, and third-party system 770 may be connected to each other directly, bypassing network 710. As another example, two or more of client system 730, social-networking system 760, and third-party system 770 may be physically or logically co-located with each other in whole or in part. Moreover, although FIG. 7 illustrates a particular number of client systems 730, social-networking systems 760, third-party systems 770, and networks 710, this disclosure contemplates any suitable number of client systems 730, social-networking systems 760, third-party systems 770, and networks 710. As an example and not by way of limitation, network environment 700 may include multiple client system 730, social-networking systems 760, third-party systems 770, and networks 710.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

In particular embodiments, client system 730 may be an electronic device including hardware, software, or embedded logic components or a combination of two or more such components and capable of carrying out the appropriate functionalities implemented or supported by client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 730. A client system 730 may enable a network user at client system 730 to access network 710. A client system 730 may enable its user to communicate with other users at other client systems 730.

In particular embodiments, client system 730 may include a web browser 732, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 730 may enter a Uniform Resource Locator (URL) or other address directing the web browser 732 to a particular server (such as server 762, or a server associated with a third-party system 770), and the web browser 732 may generate a Hyper Text Transfer Protocol (HTTP) request and communicate the HTTP request to server. The server may accept the HTTP request and communicate to client system 730 one or more Hyper Text Markup Language (HTML) files responsive to the HTTP request. Client system 730 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 760 may be a network-addressable computing system that can host an online social network. Social-networking system 760 may generate, store, receive, and send social-networking data, such as, for example, user-profile data, concept-profile data, social-graph information, or other suitable data related to the online social network. Social-networking system 760 may be accessed by the other components of network environment 700 either directly or via network 710. As an example and not by way of limitation, client system 730 may access social-networking system 760 using a web browser 732, or a native application associated with social-networking system 760 (e.g., a mobile social-networking application, a messaging application, another suitable application, or any combination thereof) either directly or via network 710. In particular embodiments, social-networking system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, social-networking system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking system 760, or a third-party system 770 to manage, retrieve, modify, add, or delete, the information stored in data store 764.

In particular embodiments, social-networking system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. Social-networking system 760 may provide users of the online social network the ability to communicate and interact with other users. In particular embodiments, users may join the online social network via social-networking system 760 and then add connections (e.g., relationships) to a number of other users of social-networking system 760 to whom they want to be connected. Herein, the term "friend" may refer to any other user of social-networking system 760 with whom a user has formed a connection, association, or relationship via social-networking system 760.

In particular embodiments, social-networking system 760 may provide users with the ability to take actions on various types of items or objects, supported by social-networking system 760. As an example and not by way of limitation, the items and objects may include groups or social networks to which users of social-networking system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 760 or by an external system of third-party system 770, which is separate from social-networking system 760 and coupled to social-networking system 760 via a network 710.

In particular embodiments, social-networking system 760 may be capable of linking a variety of entities. As an example and not by way of limitation, social-networking system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating social-networking system 760. In particular embodiments, however, social-networking system 760 and third-party systems 770 may operate in conjunction with each other to provide social-networking services to users of social-networking system 760 or third-party systems 770. In this sense, social-networking system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 760 also includes user-generated content objects, which may enhance a user's interactions with social-networking system 760. User-generated content may include anything a user can add, upload, send, or "post" to social-networking system 760. As an example and not by way of limitation, a user communicates posts to social-networking system 760 from a client system 730. Posts may include data such as status updates or other textual data, location information, photos, videos, links, music or other similar data or media. Content may also be added to social-networking system 760 by a third-party through a "communication channel," such as a newsfeed or stream.

In particular embodiments, social-networking system 760 may include a variety of servers, sub-systems, programs, modules, logs, and data stores. In particular embodiments, social-networking system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 760 may also include suitable components such as network interfaces, security mechanisms, load balancers, failover servers, management-and-network-operations consoles, other suitable components, or any suitable combination thereof. In particular embodiments, social-networking system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 760 to one or more client systems 730 or one or more third-party system 770 via network 710. The web server may include a mail server or other messaging functionality for receiving and routing messages between social-networking system 760 and one or more client systems 730. An API-request server may allow a third-party system 770 to access information from social-networking system 760 by calling one or more APIs. An action logger may be used to receive communications from a web server about a user's actions on or off social-networking system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from client system 730 responsive to a request received from client system 730. Authorization servers may be used to enforce one or more privacy settings of the users of social-networking system 760. A privacy setting of a user determines how particular information associated with a user can be shared. The authorization server may allow users to opt in to or opt out of having their actions logged by social-networking system 760 or shared with other systems (e.g., third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Figure 8:
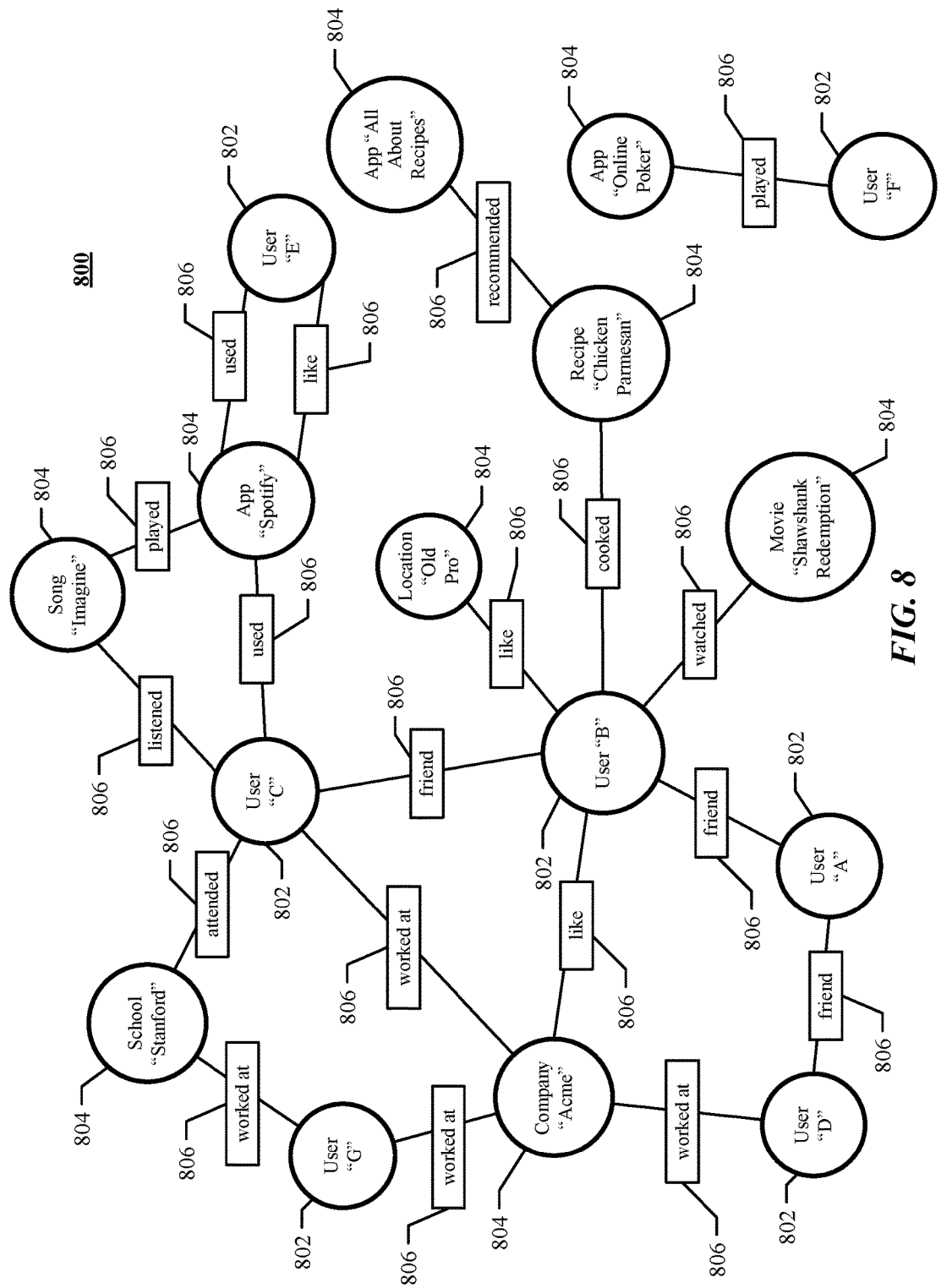
FIG. 8 illustrates an example social graph.

FIG. 8 illustrates example social graph 800. In particular embodiments, social-networking system 760 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social-networking system 760, client system 730, or third-party system 770 may access social graph 800 and related social-graph information for suitable applications. The nodes and edges of social graph 800 may be stored as data objects, for example, in a data store (such as a social-graph database). Such a data store may include one or more searchable or queryable indexes of nodes or edges of social graph 800.

In particular embodiments, a user node 802 may correspond to a user of social-networking system 760. As an example and not by way of limitation, a user may be an individual (human user), an entity (e.g., an enterprise, business, or third-party application), or a group (e.g., of individuals or entities) that interacts or communicates with or over social-networking system 760. In particular embodiments, when a user registers for an account with social-networking system 760, social-networking system 760 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with social-networking system 760. In particular embodiments, a user node 802 may be associated with information provided by a user or information gathered by various systems, including social-networking system 760. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more webpages.

In particular embodiments, a concept node 804 may correspond to a concept. As an example and not by way of limitation, a concept may correspond to a place (such as, for example, a movie theater, restaurant, landmark, or city); a website (such as, for example, a website associated with social-network system 760 or a third-party website associated with a web-application server); an entity (such as, for example, a person, business, group, sports team, or celebrity); a resource (such as, for example, an audio file, video file, digital photo, text file, structured document, or application) which may be located within social-networking system 760 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 804 may be associated with information of a concept provided by a user or information gathered by various systems, including social-networking system 760. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social-networking system 760. Profile pages may also be hosted on third-party websites associated with a third-party system 770. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 770. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 730 to send to social-networking system 760 a message indicating the user's action. In response to the message, social-networking system 760 may create an edge (e.g., a check-in-type edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social-networking system 760 may send a "friend request" to the second user. If the second user confirms the "friend request," social-networking system 760 may create an edge 806 connecting the first user's user node 802 to the second user's user node 802 in social graph 800 and store edge 806 as social-graph information in one or more of data stores 764. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social-networking system 760 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 760 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social-networking system 760 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, social-networking system 760 may create an edge 806 between a user node 802 and a concept node 804 in social graph 800. As an example and not by way of limitation, a user viewing a concept-profile page (such as, for example, by using a web browser or a special-purpose application hosted by the user's client system 730) may indicate that he or she likes the concept represented by the concept node 804 by clicking or selecting a "Like" icon, which may cause the user's client system 730 to send to social-networking system 760 a message indicating the user's liking of the concept associated with the concept-profile page. In response to the message, social-networking system 760 may create an edge 806 between user node 802 associated with the user and concept node 804, as illustrated by "like" edge 806 between the user and concept node 804. In particular embodiments, social-networking system 760 may store an edge 806 in one or more data stores. In particular embodiments, an edge 806 may be automatically formed by social-networking system 760 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, social-networking system 760 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 770 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 760 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 760 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 760 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 760 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 760 may calculate a coefficient based on a user's actions. Social-networking system 760 may monitor such actions on the online social network, on a third-party system 770, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 760 may calculate a coefficient based on the user's actions with particular types of content. The content may be associated with the online social network, a third-party system 770, or another suitable system. The content may include users, profile pages, posts, news stories, headlines, instant messages, chat room conversations, emails, advertisements, pictures, video, music, other suitable objects, or any combination thereof. Social-networking system 760 may analyze a user's actions to determine whether one or more of the actions indicate an affinity for subject matter, content, other users, and so forth. As an example and not by way of limitation, if a user frequently posts content related to "coffee" or variants thereof, social-networking system 760 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 760 may calculate a coefficient based on the type of relationship between particular objects. Referencing the social graph 800, social-networking system 760 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than a user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 760 may determine that the user has a higher coefficient with respect to the first photo than the second photo because having a tagged-in-type relationship with content may be assigned a higher weight and/or rating than having a like-type relationship with content. In particular embodiments, social-networking system 760 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 760 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, social-networking system 760 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 730 of the user). A first user may be more interested in other users or concepts that are closer to the first user. As an example and not by way of limitation, if a user is one mile from an airport and two miles from a gas station, social-networking system 760 may determine that the user has a higher coefficient for the airport than the gas station based on the proximity of the airport to the user.

In particular embodiments, social-networking system 760 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 760 may provide information that is relevant to user's interests and current circumstances, increasing the likelihood that they will find such information of interest. In particular embodiments, social-networking system 760 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 760 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 760 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 770 (e.g., via an API or other communication channel), or from another suitable system. In response to the request, social-networking system 760 may calculate the coefficient (or access the coefficient information if it has previously been calculated and stored). In particular embodiments, social-networking system 760 may measure an affinity with respect to a particular process. Different processes (both internal and external to the online social network) may request a coefficient for a particular object or set of objects. Social-networking system 760 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Figure 9:
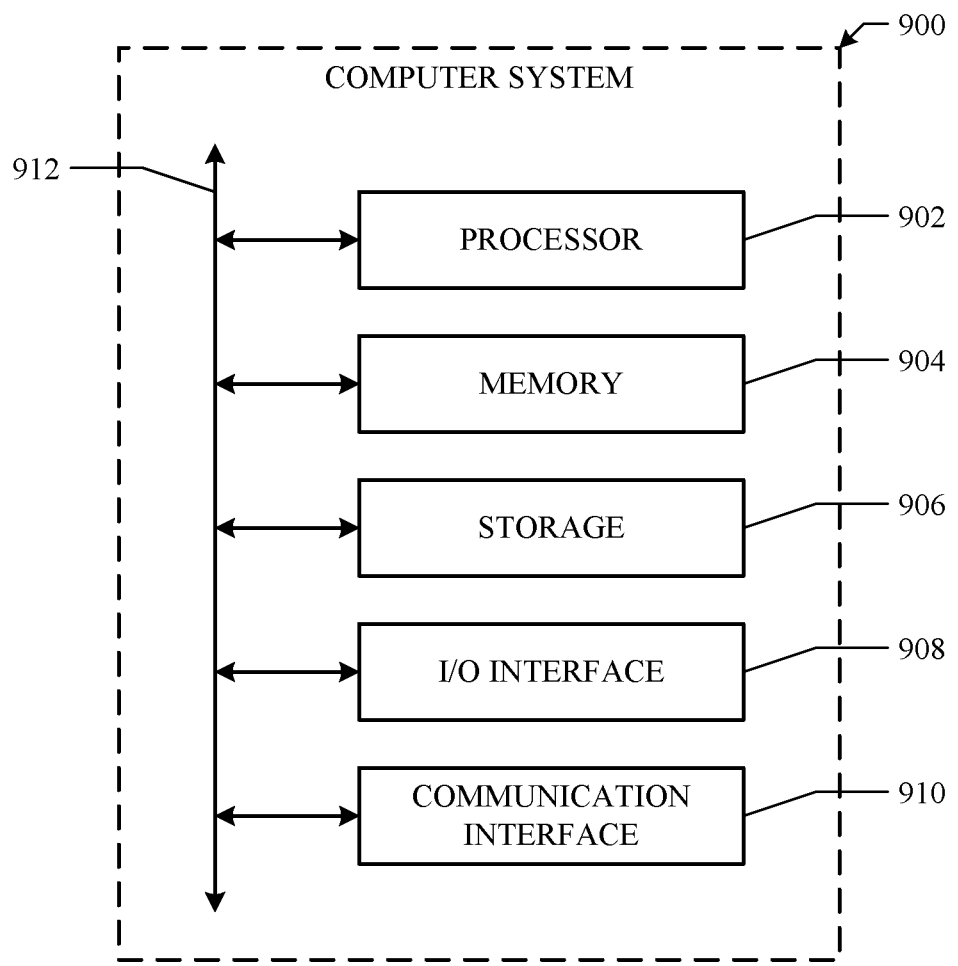
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by a video production device, determining a layout for an output screen, wherein the layout is determined at least in part based on a producer interface being operated by a producer;
    by the video production device, displaying a plurality of data input streams on the output screen in accordance with the layout, each of the data input streams being generated by one of a plurality of image capture devices, wherein each of the image capture devices comprises a display screen that displays guidelines as the image capture device captures the respective data input stream, the guidelines having a first dimension that is based at least in part on the layout;

by the video production device, receiving, from the producer interface, user input comprising instructions to change the layout; and by the video production device, sending instructions to one or more of the plurality of image capture devices to adjust the guidelines to a second dimension based on the change to the layout.

2. The method of claim 1, wherein the user input comprising instructions to change the layout for the output screen further comprises an instruction that the producer has added at least one additional data input stream to the output screen.

3. The method of claim 1, wherein the user input comprising instructions to change the layout for the output screen further comprises an instruction that the producer has added a media item to the output screen.

4. The method of claim 3, wherein the media item comprises a title bar, a news item, or a username.

5. The method of claim 1, further comprising:
sending a web resource to an additional image capture device not included in the plurality of image capture devices, wherein the additional image capture device generates an additional data input stream;
receiving an acknowledgement from the additional image capture device; and
adding the additional data input stream to the plurality of data input streams based on the acknowledgement.

6. The method of claim 5, wherein the web resource comprises a Universal Resource Locator or a matrix barcode.

7. The method of claim 1, wherein the layout is inaccessible by one or more users each operating one or more of the plurality of image capture devices.

8. The method of claim 1, wherein the image capture device captures still images, video images, and audio data, and wherein the data input stream comprises still images, video images, and audio data.

9. The method of claim 1, wherein the producer interface comprises a plurality of input streams each displayed in a window on the producer interface, each window being selectable for display on the output screen, the output screen displaying a subset of the input streams displayed on the producer interface.

10. The method of claim 1, wherein the first dimension comprises a first vertical dimension and a first horizontal dimension and the second dimension comprises a second vertical dimension and a second horizontal dimension, wherein the second horizontal dimension is smaller than the first horizontal dimension.

11. A system comprising: one or more processors and one or more computer-readable non-transitory storage media coupled to one or more of the processors, the one or more computer-readable non-transitory storage media comprising instructions operable when executed by one or more of the processors to cause the system to perform operations comprising:
determining a layout for an output screen, wherein the layout is determined at least in part based on a producer interface being operated by a producer;
displaying a plurality of data input streams on the output screen in accordance with the layout, each of the data input streams being generated by one of a plurality of image capture devices, wherein each of the image capture devices comprises a display screen that displays guidelines as the image capture device captures the respective data input stream, the guidelines having a first dimension that is based at least in part on the layout;
receiving, from the producer interface, user input comprising instructions to change the layout; and
sending instructions to one or more of the plurality of image capture devices to adjust the guidelines to a second dimension based on the change to the layout.

12. The system of claim 10, wherein the user input comprising instructions to change the layout for the output screen further comprises an instruction that the producer has added at least one additional data input stream to the output screen.

13. The system of claim 10, wherein the user input comprising instructions to change the layout for the output screen further comprises an instruction that the producer has added a media item to the output screen.

14. The system of claim 13, wherein the media item comprises a title bar, a news item, or a username.

15. The system of claim 10, wherein the processors are further operable when executing the instructions to perform operations comprising:
sending a web resource to an additional image capture device not included in the plurality of image capture devices, wherein the additional image capture device generates an additional data input stream;
receiving an acknowledgement from the additional image capture device; and
adding the additional data input stream to the plurality of data input streams based on the acknowledgement.

16. One or more computer-readable non-transitory storage media embodying software that is operable when executed to cause one or more processors to perform operations comprising:
determining a layout for an output screen, wherein the layout is determined at least in part based on a producer interface being operated by a producer;
displaying a plurality of data input streams on the output screen in accordance with the layout, each of the data input streams being generated by one of a plurality of image capture devices, wherein each of the image capture devices comprises a display screen that displays guidelines as the image capture device captures the respective data input stream, the guidelines having a first dimension that is based at least in part on the layout;
receiving, from the producer interface, user input comprising instructions to change the layout; and
sending instructions to one or more of the plurality of image capture devices to adjust the guidelines to a second dimension based on the change to the layout.

17. The media of claim 16, wherein the user input comprising instructions to change the layout for the output screen further comprises an instruction that the producer has added at least one additional data input stream to the output screen.

18. The media of claim 16, wherein the user input comprising instructions to change the layout for the output screen comprises an instruction that the producer has added a media item to the output screen.

19. The media of claim 18, wherein the media item comprises a title bar, a news item, or a username.

20. The media of claim 16, wherein the software is further operable when executed to cause the one or more processors to perform operations comprising:
    sending a web resource to an additional image capture device not included in the plurality of image capture devices, wherein the additional image capture device generates an additional data input stream;
    receiving an acknowledgement from the additional image capture device; and
    adding the additional data input stream to the plurality of data input streams based on the acknowledgement.

\* \* \* \* \*